United States Patent Office 3,048,455
Patented Aug. 7, 1962

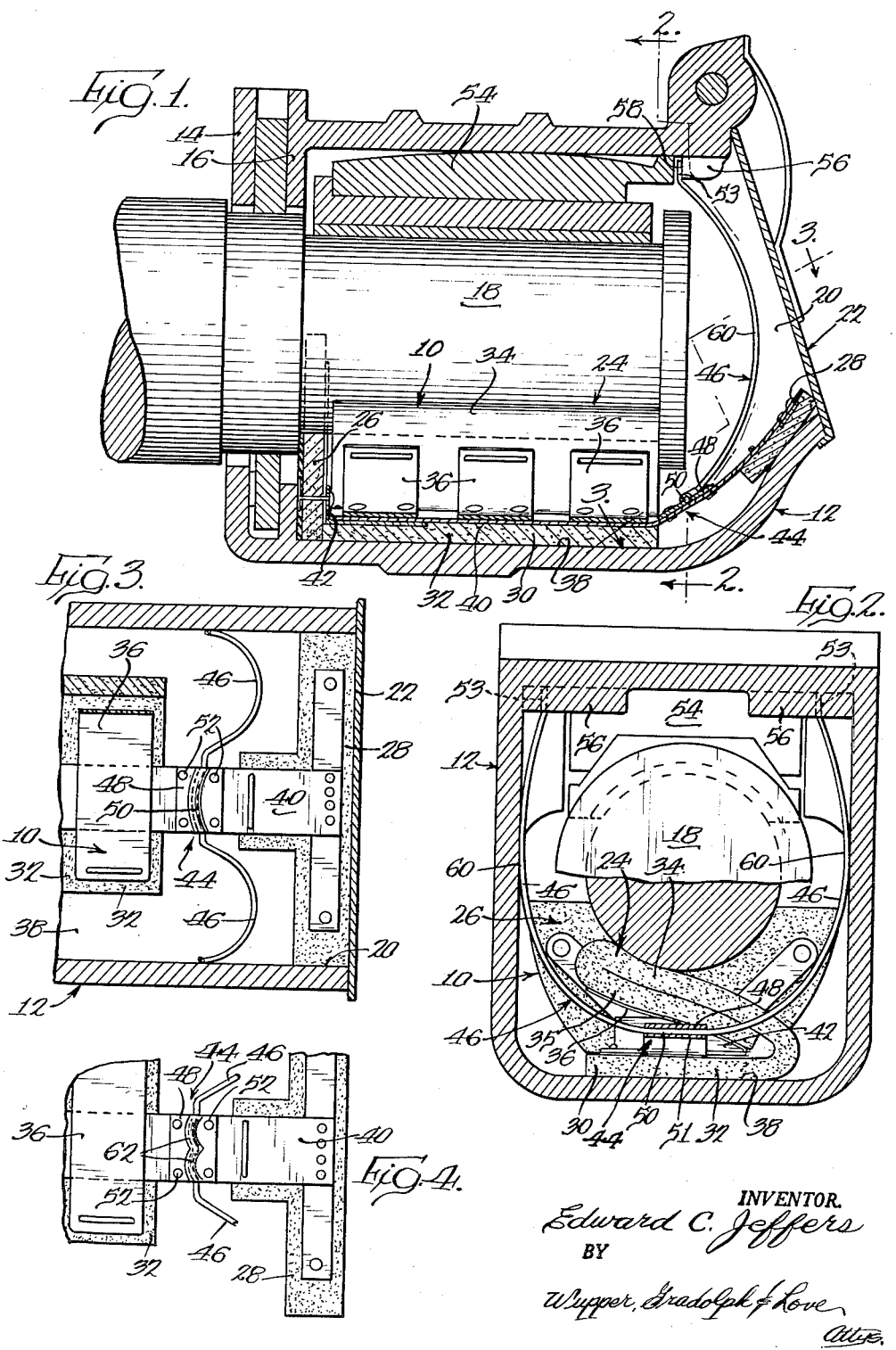

3,048,455
ACCURATE JOURNAL LUBRICATORS
Edward C. Jeffers, 2610 Eastwood Ave., Chicago 25, Ill.
Filed Dec. 21, 1959, Ser. No. 860,889
5 Claims. (Cl. 308—88)

The present invention relates to journal lubricating devices and in particular to such devices having novel means for properly locating and anchoring the lubricator elements in relation to the journal.

It is the principal object of the present invention to provide a journal lubricator with new and improved means for anchoring said journal lubricator so that when it is installed in a journal box, it properly locates the elements thereof with respect to the journal and insures an even distribution and application of lubricant under all operating conditions.

Another object is to provide a journal lubricator with novel and improved anchoring means which provides easy installation of the journal lubricator in the journal box and does not require any alteration or modification of the journal box.

A further object of the present invention is to provide a journal lubricator with novel anchoring means to hold the lubricator in place and to prevent it from shifting in the journal box because of impact or other operating conditions.

Still another object of the present invention is to provide a journal lubricator with novel anchoring means by virtue of which the journal lubricator may easily be installed in and removed from the journal box without the use of tools.

Other objects and advantages will become apparent from the following description taken in conjunction with the accompanying drawings, wherein:

FIG. 1 is a longitudinal section through the journal box and lubricator showing the pad of the lubricator in engagement with the journal;

FIG. 2 is a transverse section and may be considered as being taken substantially along the line 2—2 of FIG. 1, looking in the direction of the arrows;

FIG. 3 is a sectional view taken substantially along the line 3—3 of FIG. 1, looking in the direction of the arrows, and showing the anchoring retainer means of the present invention; and FIG. 4 is a view similar to FIG. 3, showing a modified form of the anchoring retainer means.

In the drawings, the reference numeral 10 indicates in its entirely the journal lubricator with the novel anchoring means of the present invention. The journal lubricator 10 is located in the journal box 12 below the journal 18 which extends through the inner walls 14 and 16 of the journal box 12. The journal box 12 has a conventional opening 20 at its outer side or face which is closed by a conventional spring biased lid 22.

The journal lubricator 10 includes a journal lubricating section 24, a fillet seal and lubricating section 26, a lid seal section 28, and a mounting and retaining means 44. The journal lubricating section 24 comprises a sheet of porous, fibrous material 30 which preferably, because of its friction reducing qualities, is a silicon impregnated wool felt.

The felt sheet 30 is folded to provide a base segment 32 and a journal lubricating segment 34. The journal lubricating segment 34 extends upwardly and is held against the journal 18 by a plurality of biasing members 36 at an acute angle to the base segment 32.

The base segment 32 is positioned in the well 38 of the journal box 12 and permits lubricant to be conducted through the lubricating section 34 to the journal 18. The upper and outer end of the lubricating segment 34 is folded back and under itself at 35 to insure that the journal 18 is contacted by the lubricant impregnated segment 34 over a substantial portion of its circumference as is shown in FIG. 2.

A spring metal mounting strip 40 is secured to the journal lubricating, fillet seal, and lubricating and lid seal sections 24, 26, and 28 of the journal lubricator 10 and extends from the inner end of the base segment 32 past the lubricating segment 34 and toward the front of the open end of the journal box 12. At its forward end the mounting strip 40 overlies and is secured to the lid seal section 28. Intermediate its ends the mounting strip 40 overlies the base segment 32 and is secured to the journal lubricating section 24. At its inner end it is riveted to an angle 42 whose vertical side constitutes a connection to the fillet seal and lubricator assembly 26. From the above description it is apparent that the mounting strip 40 connects and holds together all the individual segments of the journal lubricator 10. The general organization of the journal lubricator 10 is more fully described in Edward C. Jeffers and Martin C. Jeffers Patent No. 2,825,609, dated March 4, 1958.

The anchoring means 44, as best seen in FIGS. 3 and 4, includes a spring wire retainer 46 which has its center 51 anchored at or adjacent the outer end of the base segment 32 to the metal mounting strip 40 by a metal plate 48. The metal plate 48 is formed with an arcuate groove 50 which embraces a complementally shaped section 51 of the wire retainer 46 which extends therethrough with only a limited rocking movement therein. The plate 48 is secured to the metal mounting strip 40 by a plurality of rivets 52 and thus, with the strip 40, holds the center 51 of the wire retainer. The outer ends 53 of the wire retainer 46 are anchored in the space between the wedge 54 and a lug 56 at the upper part of the journal box 12.

The journal lubricating device of the present invention is installed in the journal box by compressing the journal lubricating segment 34 toward the base segment 32 so that the entire journal lubricator may be slipped under the outer flange of the journal 18. With a steady pressure, the journal lubricator is then located in the journal box under the journal 18 so that the fillet seal 26 bears against the journal box wall 16. The spring mounting strip 40 is then pressed down and the ends 53 of the wire retainer 46 are forced into the recesses behind the lug 56 and in front of the wedge 54. Those intermediate portions 60 of the wire retainer 46 between the ends 53 and the center portion 51 bow outwardly or toward the lid 22 and the spring wire exerts a downward and inward force on the mounting strip 40 to hold the entire journal lubricating assembly securely in place. The anchoring means 44 holds the lubricator 10 against in and out as well as rocking movement in the journal box, thus insuring that the lubricator furnishes a steady and even supply of lubricant to the journal under all travel conditions. By exerting downward and inward pressure on the mounting strip 40, the retainer prevents lubricant from splashing out of the inner end of the journal box by holding the fillet seal 26 tightly against the inner wall 16.

The lubricating device 10 may be very easily removed without the use of any tools by merely pressing down the ends of the wire retainer 44, disengaging the ends 53 from the recess 58 behind the lug 56, and pulling the whole journal lubricator assembly 10 out of the journal box 12.

In FIG. 4 there is shown a modified arrangement for connecting the center of the spring retaining wire 46 to the mounting strip 40. The metal plate is formed with a pair of arcuate grooves 62 and the wire 46 is complementally shaped. Other connecting shapes for the plate groove and wire may be used, it being important that the wire retainer 46 have a controlled and limited, if any, rocking movement relative to the strip 40. The use and functioning of this form is the same as that of FIGS. 1 to 3.

From the foregoing it will be appreciated that the objectives which are claimed for the present invention are attained by the disclosed structures.

While preferred embodiments of the present invention have been shown and described, it will be apparent that numerous modifications and variations thereof may be made without departing from the underlying principles of the invention. It is, therefore, desired, by the following claims, to include within the scope of the invention all such variations and modifications by which substantially the result of the invention may be obtained through the use of substantially the same or equivalent means.

What is claimed as new and desired to be secured by United States Letters Patent is:

1. A journal lubricating device adapted to be mounted in a journal box through the inner end wall of which extends a journal which has a well below the journal for holding a liquid lubricant, an access opening opposite the end wall, and a lid closing the opening, comprising, a sheet of porous, fibrous material having a base segment locatable in the journal well and an angularly upwardly extending lubricating segment pressable against the journal, a mounting strip overlying said base segment, and a spring wire retainer secured to said mounting strip at the outer end of said base segment, the ends of said wire retainer being engageable with a fixed part of the journal box adjacent its upper end and urging the mounting strip downwardly and inwardly, thereby securely holding said lubricating device in a journal lubricating position.

2. A journal lubricating device adapted to be mounted in a journal box through the inner end wall of which extends a journal which has a well below the journal for holding a liquid lubricant, an access opening opposite the end wall, and a lid closing the opening, comprising, a sheet of porous, fibrous material having a base segment locatable in the journal well and an angularly upwardly extending lubricating segment pressable against the journal, a mounting strip overlying said base segment and having an inclined portion facing the opening, a spring wire retainer slightly movably secured to the inclined portion of said mounting strip by a metal plate having a groove therein, means securing said metal plate to the metal mounting strip, and said wire retainer extending centrally through the groove and having its ends extending upwardly in a position to engage in the recess between the journal wedge and lug means on the journal box to urge the mounting strip downwardly and inwardly, thereby firmly securing the lubricating device in a journal lubricating position.

3. A journal lubricating device adapted to be mounted in a journal box through the inner end wall of which extends a journal which has a well below the journal for holding a liquid lubricant, an access opening opposite the end wall, and a lid closing the opening, comprising, a sheet of porous, fibrous material having a base segment locatable in the journal well and an angularly, upwardly extending lubricating segment pressable against the journal, a mounting strip overlying said base segment and having an inclined portion facing the opening, a spring wire retainer slightly movably secured to the inclined portion of said mounting strip by a metal plate having a groove therein, means securing said metal plate to the metal mounting strip, and said wire retainer extending centrally through the groove, having its ends extending upwardly in a position to engage in the recess between the journal wedge and lug means on the journal box, and having its intermediate portions bowed outwardly to force the mounting strip and thus the lubricator downwardly and inwardly, thereby firmly holding the lubricating device in a journal lubricating position.

4. A journal lubricating device adapted to be mounted in a journal box through the inner end wall of which extends a journal which has a well below the journal for holding a liquid lubricant, an access opening opposite the end wall and a lid closing the opening, comprising, a sheet of porous, fibrous material having a base segment locatable in the journal well and an angularly, upwardly extending lubricating segment pressable against the journal, a mounting strip overlying said base segment and having an inclined portion facing the opening, a spring wire retainer slightly movably secured to the inclined portion of said mounting strip by a metal plate having a planar arcuate groove therein, means securing said metal plate to the metal mounting strip, and the central portion of said spring wire retainer being complementally shaped to extend through said groove of said metal plate, having its ends extending upwardly in a position to engage in the recess between the journal wedge and lug means on the journal box, and having its intermediate portions bowed toward the opening and transversely into engagement with the sides of the journal box thereby firmly securing the lubricating device in a journal lubricating position.

5. A journal lubricating device adapted to be mounted in a journal box through the inner end wall of which extends a journal which has a well below a journal for holding a liquid lubricant, an access opening opposite the end wall and a lid closing the opening, comprising, a sheet of porous, fibrous material having a base segment locatable in a journal well and an angularly upwardly extending lubricating segment pressable against the journal, a mounting strip overlying said base segment and having an inclined portion facing the opening, a spring wire retainer slightly movably secured to the inclined portion of said mounting strip by a metal plate having a planar groove including a pair of arcuate sections therein, means securing said metal plate to the said mounting strip, and said spring wire retainer being complementally shaped to extend through said groove, having its ends extending upwardly in a position to engage in the recess between the journal wedge and lug means on the journal box, and having its intermediate portions bowed toward the opening and transversely into engagement with the sides of the journal box to force the mounting strip and thus the lubricator downwardly and inwardly, thereby firmly holding the lubricating device in a journal lubricating position.

References Cited in the file of this patent

UNITED STATES PATENTS

| | | |
|---|---|---|
| 980,590 | Breaid | Jan. 3, 1911 |
| 2,812,223 | Diggins | Nov. 5, 1957 |
| 2,819,126 | Ortleb | Jan. 7, 1958 |
| 2,825,609 | Jeffers et al. | Mar. 4, 1958 |
| 2,909,395 | Kassick | Oct. 20, 1959 |